United States Patent
Barsky et al.

(10) Patent No.: US 8,819,385 B2
(45) Date of Patent: Aug. 26, 2014

(54) DEVICE AND METHOD FOR MANAGING A FLASH MEMORY

(75) Inventors: Boris Barsky, Kfar Saba (IL); Avigdor Segal, Netanya (IL); Igal Maly, Tel Aviv (IL)

(73) Assignee: Densbits Technologies Ltd., Haifa (IL)

( * ) Notice: Subject to any disclaimer, the term of this patent is extended or adjusted under 35 U.S.C. 154(b) by 743 days.

(21) Appl. No.: 12/509,749

(22) Filed: Jul. 27, 2009

(65) Prior Publication Data

US 2010/0257309 A1    Oct. 7, 2010

Related U.S. Application Data

(60) Provisional application No. 61/166,814, filed on Apr. 6, 2009.

(51) Int. Cl.
*G06F 12/00* (2006.01)
*G06F 12/02* (2006.01)

(52) U.S. Cl.
CPC .... *G06F 12/0246* (2013.01); *G06F 2212/7207* (2013.01); *G06F 2212/7201* (2013.01)
USPC .......................................... 711/202; 711/206

(58) Field of Classification Search
CPC .......................... G06F 12/0292; G06F 12/1027
USPC ................................................. 711/202, 206
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |
| 5,003,597 A | 3/1991 | Merkle |
| 5,077,737 A | 12/1991 | Leger et al. |
| 5,297,153 A | 3/1994 | Baggen et al. |
| 5,305,276 A | 4/1994 | Uenoyama |
| 5,592,641 A | 1/1997 | Doyle et al. |
| 5,623,620 A | 4/1997 | Alexis et al. |
| 5,640,529 A | 6/1997 | Hasbun |
| 5,657,332 A | 8/1997 | Auclair et al. |

(Continued)

FOREIGN PATENT DOCUMENTS

WO    WO2009053963 A2    4/2009

OTHER PUBLICATIONS

Search Report of PCT Patent Application WO 2009/118720 A3.
Search Report of PCT Patent Application WO 2009/095902 A3.

(Continued)

*Primary Examiner* — Gurtej Bansal
(74) *Attorney, Agent, or Firm* — Dentons US LLP (57) ABSTRACT

A method for accessing a flash memory, the method includes: receiving a read request that is associated with a logical address that is mapped to a physical address of a set of flash memory cells; accessing multiple mapping data structures of different granularity to obtain the physical address of the set of flash memory cells; wherein during at least one point in time at least one mapping data structure is stored in an erase block and wherein the erase block comprises multiple physical pages that are written in a sequential manner and are associated with logical page addresses that are assigned in a random manner; and reading a content of the set of flash memory cells.

22 Claims, 4 Drawing Sheets

(56) References Cited

U.S. PATENT DOCUMENTS

| | | |
|---|---|---|
| 5,663,901 A | 9/1997 | Harari et al. |
| 5,724,538 A | 3/1998 | Morris et al. |
| 5,729,490 A | 3/1998 | Calligaro et al. |
| 5,740,395 A | 4/1998 | Wells et al. |
| 5,745,418 A | 4/1998 | Hu et al. |
| 5,778,430 A | 7/1998 | Ish et al. |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Hu et al. |
| 5,956,268 A | 9/1999 | Lee |
| 5,956,473 A | 9/1999 | Hu et al. |
| 5,968,198 A | 10/1999 | Balachandran |
| 5,982,659 A | 11/1999 | Irrinki et al. |
| 6,011,741 A | 1/2000 | Harari et al. |
| 6,016,275 A | 1/2000 | Han |
| 6,038,634 A | 3/2000 | Ji et al. |
| 6,081,878 A | 6/2000 | Estakhri et al. |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park et al |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett et al. |
| 7,388,781 B2 | 6/2008 | Litsyn et al. |
| 7,395,404 B2 | 7/2008 | Gorobets et al. |
| 7,441,067 B2 | 10/2008 | Gorobets et al. |
| 7,443,729 B2 | 10/2008 | Li et al. |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell et al. |
| 7,619,922 B2 | 11/2009 | Li et al. |
| 7,697,326 B2 | 4/2010 | Sommer et al. |
| 7,706,182 B2 | 4/2010 | Shalvi et al. |
| 7,716,538 B2 | 5/2010 | Gonzalez et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun et al. |
| 7,961,797 B1 | 6/2011 | Yang et al. |
| 7,975,192 B2 | 7/2011 | Sommer et al. |
| 8,020,073 B2 | 9/2011 | Emma et al. |
| 8,060,719 B2 * | 11/2011 | Radke et al. ............ 711/165 |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang et al. |
| 8,250,324 B2 | 8/2012 | Haas et al. |
| 8,300,823 B2 | 10/2012 | Bojinov et al. |
| 8,305,812 B2 | 11/2012 | Levy et al. |
| 8,327,246 B2 | 12/2012 | Weingarten et al. |
| 8,407,560 B2 | 3/2013 | Ordentlich et al. |
| 8,417,893 B2 * | 4/2013 | Khmelnitsky et al. ....... 711/135 |
| 2001/0034815 A1 | 10/2001 | Dugan et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2002/0156988 A1 | 10/2002 | Toyama et al. |
| 2002/0174156 A1 | 11/2002 | Birru et al. |
| 2003/0014582 A1 | 1/2003 | Nakanishi |
| 2003/0065876 A1 * | 4/2003 | Lasser ................. 711/103 |
| 2003/0101404 A1 | 5/2003 | Zhao et al. |
| 2003/0105620 A1 | 6/2003 | Bowen |
| 2003/0177300 A1 | 9/2003 | Lee et al. |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0059768 A1 | 3/2004 | Denk et al. |
| 2004/0080985 A1 | 4/2004 | Chang et al. |
| 2004/0153722 A1 | 8/2004 | Lee |
| 2004/0153817 A1 | 8/2004 | Norman et al. |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le Bars et al. |
| 2005/0144213 A1 | 6/2005 | Simkins et al. |
| 2005/0144368 A1 * | 6/2005 | Chung et al. ............ 711/103 |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes et al. |
| 2006/0294312 A1 | 12/2006 | Walmsley |
| 2007/0025157 A1 | 2/2007 | Wan et al. |

(56) References Cited

U.S. PATENT DOCUMENTS

| | | |
|---|---|---|
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0268754 A1* | 11/2007 | Lee et al. ................. 365/185.29 |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1* | 5/2008 | Cheon et al. ................. 711/103 |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1* | 6/2008 | Jung ............................ 257/325 |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1* | 7/2008 | Lee ............................... 711/103 |
| 2008/0168320 A1 | 7/2008 | Cassuto et al. |
| 2008/0181001 A1 | 7/2008 | Shalvi |
| 2008/0192539 A1* | 8/2008 | Choi et al. ................ 365/185.03 |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228679 A1* | 9/2009 | Jiang ............................. 711/208 |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1* | 1/2010 | Jiang ............................. 711/206 |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |

(56) References Cited

U.S. PATENT DOCUMENTS

| | | |
|---|---|---|
| 2012/0110250 A1 | 5/2012 | Sabbag et al. |
| 2012/0124273 A1 | 5/2012 | Goss et al. |
| 2012/0246391 A1 | 9/2012 | Meir et al. |

OTHER PUBLICATIONS

Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-II-372 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com).
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com.
Paulo Cappelletti, Clara Golla, Piero Olivo, Enrico Zanoni, "Flash Memories", Kluwer Academic Publishers, 1999.
Jedec Standard, "Stress-Test-Driven Qualification of Integrated Circuits", JEDEC Solid State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., " Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

* cited by examiner

DEVICE AND METHOD FOR MANAGING A FLASH MEMORY

RELATED APPLICATIONS

This application claims priority from U.S. provisional patent application Ser. No. 61/166,814, dated Apr. 6, 2009 which is incorporated herein.

FIELD OF THE INVENTION

The invention relates to field of non volatile memories and especially to managing a flash memory.

BACKGROUND OF THE INVENTION

Due to inaccuracies during the programming procedure and charge loss due to time and temperature (also known as retention), the measured levels during a Read operation suffers from detection errors. The small dimensions of the Flash cells result in cells that can store very small amounts of charge, enhancing the effects of inaccuracies due to programming and retention. Thus, new single level cells (SLC) and multi level cells (MLC) devices have significantly increased bit error rate (BER), decreasing the reliability of the device.

BER is a parameter that a flash memory device manufacturer commits to vis a vis its customers, expressing the maximum proportion of wrongly read bits (wrongly read bits/total number of bits) that users of the flash memory device need to expect at any time during the stipulated lifetime of the flash memory device e.g. 10 years.

MLC means that the physical levels in the cell are, to an acceptable level of certainty, statistically partitionable into multiple distinguishable regions, plus a region corresponding to zero, such that digital values each comprising multiple bits can be represented by the cell. In contrast, in single-level cells, the physical levels in the cell are assumed to be statistically partitionable into only two regions, one corresponding to zero and one other, non-zero region, such that only one bit can be represented by a single-level cell.

Flash devices are organized into (physical) pages. Each page contains a section allocated for data (512 bytes-8 Kbytes) and a small amount of bytes (16-32 bytes for every 512 data bytes) containing redundancy and back pointers. The redundancy bytes are used to store error correcting information, for correcting errors which may have occurred during the page Read. Each Read and Program operation is performed on an entire page. A number of pages are grouped together to form an Erase Block (EB). A page cannot be erased unless the entire EB which contains it is erased.

An important measure of a Flash device quality is the number of times (Np) it may be reprogrammed and the period that it can store information (usually 10 years) before irrecoverable errors occur.

The higher the number of program-erase cycles, the higher the BER. Thus, today's MLC with 2 bits per cell devices can perform around Np=10,000 cycles and 10 years retention before the allocation of 16 bytes of redundancy per 512 bytes of data bytes becomes insufficient to correct errors.

SLC devices usually perform better but obtain a much lower density and hence their prices are much higher. Note that following Np program-erase cycles the device is still operational but the BER is higher.

One factor that increases the number of program-erase cycles is the fact that an entire block must be erased at once. For example, when a single page of a programmed block is to be modified, in many cases (e.g. SD cards and USB drives), the block is copied to an erased block and the relevant page is replaced in the process. Thus, a single page change required the programming of an entire block and an erasure of a block. This process is usually referred to as a read modify write operation.

SUMMARY OF THE INVENTION

A method for accessing a flash memory, the method includes: (i) receiving a read request that is associated with a logical address that is mapped to a physical address of a set of flash memory cells; (ii) accessing multiple mapping data structures of different granularity to obtain the physical address of the set of flash memory cells; wherein during at least one point in time at least one mapping data structure is stored in an erase block and wherein the erase block comprises multiple physical pages that are written in a sequential manner and are associated with logical page addresses that are assigned in a random manner; and (iii) accessing the set of flash memory cells.

A method for writing to a flash memory, the method includes: receiving a write request to write content, wherein the write request is associated with a logical address; writing the write content to a new set of flash memory cells that follow a last set of flash memory cells that were written to; and updating at least one mapping data structure out of multiple mapping data structures to reflect the writing to the new set of flash memory cells; wherein the multiple mapping data structures are of different granularity; wherein during at least one point in time at least one mapping data structure is stored in an erase block and wherein the erase block comprises multiple physical pages that are written in a sequential manner and are associated with logical page addresses that are assigned in a random manner.

A mapping data structure of a certain granularity can store only information associated with the certain granularity.

The logic address of the set of flash memory cells includes a logical erase block address and a logical inter erase block address. The method can include accessing a first mapping data structure that maps logical erase block addresses to physical erase block addresses and accessing a second mapping data structure that maps logical inter erase block addresses to physical inter erase block addresses.

The second data can be stored in the flash memory.

The method can include generating the multiple mapping data structures; wherein the second mapping data structure is written to the flash memory after a predefined number of physical pages of the erase block were written.

The second mapping data structure maps logical addresses of pages to physical addresses of pages; wherein evenly sized logical pages are stored in evenly sized physical pages.

The first mapping data structure can be stored, during at least one period, in memory unit that differs from the flash memory.

The method can include accessing a first mapping data structure, a second data structure and a third data structure; wherein the first mapping data structure maps logical erase block addresses to physical erase block addresses, the second mapping data structure maps logical page addresses to indexes into the third mapping data structure; wherein the third data structure maps the indexes to locations of sets of flash memory cells; wherein at least one erasure block includes two sets of flash memory cells that differ from each other by their size.

The at least two sets of memory cells can store information that is encoded by a variable encoding process.

The method can include fetching a mapping data structure from a memory unit that differs from the flash memory and storing the fetched mapping data structure in the flash memory.

A system having flash memory management capabilities, the system includes a management module that is coupled to a flash memory, another memory unit, and an interface; wherein the interface receives a read request that is associated with a logical address that is mapped to a physical address of a set of flash memory cells; wherein the flash memory includes multiple erase blocks; wherein the management module is adapted to: access multiple mapping data structures of different granularity to obtain the physical address of the set of flash memory cells; wherein at least one mapping data structure is stored in an erase block and wherein the erase block includes multiple physical pages that are written in a sequential manner and are associated with logical page addresses that are assigned in a random manner; and access the set of flash memory cells.

A system having flash memory management capabilities, the system includes a management module that is coupled to a flash memory, another memory unit, and an interface; wherein the interface receives a write request to write content, wherein the write request is associated with a logical address; wherein the flash memory comprises multiple erase blocks. The management module is adapted to: write the write content to a new set of flash memory cells that follow a last set of flash memory cells that were written to; and update at least one mapping data structure out of multiple mapping data structures to reflect the writing to the new set of flash memory cells; wherein the multiple mapping data structures are of different granularity; wherein during at least one point in time at least one mapping data structure is stored in an erase block and wherein the erase block comprises multiple physical pages that are written in a sequential manner and are associated with logical page addresses that are assigned in a random manner.

A mapping data structure of a certain granularity can store only information associated with the certain granularity.

The logic address of the set of flash memory cells can include a logical erase block address a logical inter erase block address. The management module can access a first mapping data structure that maps logical erase block addresses to physical erase block addresses and access a second mapping data structure that maps logical inter erase block addresses to physical inter erase block addresses.

During at least one point in time the second data can be stored in the flash memory.

The management module can generate the multiple mapping data structures; wherein the system writes the second mapping data to the flash memory after a predefined number of physical pages of the erase block were written.

The second mapping data structure can map logical addresses of pages to physical addresses of pages; wherein evenly sized logical pages are stored in evenly sized physical pages.

The first mapping data structure can be stored, during at least one period, in the other memory unit.

The management module can access a first mapping data structure, a second data structure and a third data structure; wherein the first mapping data structure maps logical erase block addresses to physical erase block addresses, the second mapping data structure maps logical page addresses to indexes into the third mapping data structure; wherein the third data structure maps the indexes to locations of sets of flash memory cells; wherein at least one erasure block includes two sets of flash memory cells that differ from each other by their size.

The at least two sets of memory cells can store information that is encoded by a variable encoding process.

The management module can fetch a mapping data structure from the other memory unit and can store the fetched mapping data structure in the flash memory.

BRIEF DESCRIPTION OF THE DRAWINGS

Further details, aspects, and embodiments of the invention will be described, by way of example only, with reference to the drawings.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The following terms may be construed either in accordance with any definition thereof appearing in the prior art literature or in accordance with the specification, or as follows:

Cell: A component of flash memory that stores one bit of information (in single-level cell devices) or n bits of information (in a multi-level device having $2^n$ levels). Typically, each cell includes a floating-gate transistor. The variable n may or may not be an integer.

Flash memory: A non volatile memory (NVM) that includes cells that are erased block by block, each block typically comprising more than one page, but are written into and read from, page by page. Includes NOR-type flash memory, NAND-type flash memory, and PRAM, e.g. Samsung PRAM, inter alia, and flash memory devices with any suitable number of levels per cell, such as but not limited to two four or eight.

Logical page: a portion of typically sequential data, whose amount is typically less than or equal to a predetermined amount of data defined to be a page full of data, which has typically been defined by a host (data source/destination) or user thereof, as a page, and which is sent by the host to a flash memory device for storage and is subsequently read by the host from the flash memory device.

Physical Page: A portion, typically 512 or 2048 or 4096 bytes in size, of a flash memory e.g. a NAND or NOR flash memory device. Writing and reading is typically performed physical page by physical page, as opposed to erasing which can be performed only erase sector by erase sector. A few bytes, typically 16-32 for every 512 data bytes are associated with each page), for storage of error correction information. A typical block may include 32 512-byte pages or 64 2048-byte pages. Alternatively, a physical page is an ordered set (e.g. sequence or array) of flash memory cells which are all written in simultaneously by each write operation. The set typically includes a predetermined number of typically physically adjacent flash memory cells containing actual data written by the host and subsequently read by the host, as well as, typically error correction information and back pointers used for recognizing the true address of a page.

It has been shown that in order to decrease erase the number of program-erase cycles and in order to decrease BER several physical pages of an erase block should written in a sequential manner. In order to allow an assignment of logical addresses in a random manner—that is not bounded by the sequential writing manner—a mapping of logical to physical addresses is provided. For example, assuming that an erase block include physical pages PP(1)-PP(J) then a sequence of J write requests will result in writing content to the first physical page PP(1), to second physical page PP(2), till the J'th physical page—regardless of the logical addresses associated with the write requests. The sequence of write requests can include read request that do not interfere with the sequential writing to physical pages PP(1)-PP(J). The sequence of write requests usually follows an erasing of the erase block. If more than L write requests are received then more than an erase block is written to. Multiple mapping data structure are generated and maintained in order to facilitate the sequential writing and the random allocation of logical addresses.

One or more mapping data structure can be stored (at one or more point in time) in the flash memory and can be stored (during one or more periods) at another memory. A mapping data structure can be stored in the flash memory before a device is shut down, while the device remains shut down or after the entire erase block is written to.

Different ways to manage a logical to physical table may be implemented, according to different embodiments of the invention. One possibility is mapping logical to physical addresses in a page resolution. This can simplify the mapping scheme but can require a large space. For example, a flash memory of 16 GB with 4 KB long pages includes 4 Million pages. This requires a logical to physical table that include four million entries, each of three bytes long. This amount in 12 MB logical to physical table. Storing this table or even a small fraction of the table in SD/MMC controller is not practical and can result in a very high miss rate. For example—if the available space for storing mapping information us about 128 KB than only about one percent of the logical to physical table can be stored in that available space. It means that for almost each read page request, two pages should read from flash, one for data and one for table.

Therefore, other solutions may be required for system with area limitations. According to an aspect of the invention, an improved solution with respect to RAM size is suggested. Instead of mapping all the logical space into physical space in page resolution, it can be done by generating multiple mapping data structure of different granularity.

A mapping data structure stores information that maps between addresses. It can map between a logical address to a physical address, between a physical address to a semi-physical address, between a semi-physical address and a physical address and the like. A non limiting example of a mapping data structure is a mapping table although other data structures can be provided. Sets of flash memory cells are written in a sequential manner while mapping data structure facilitate the random allocation of logical addresses.

Figure 1:
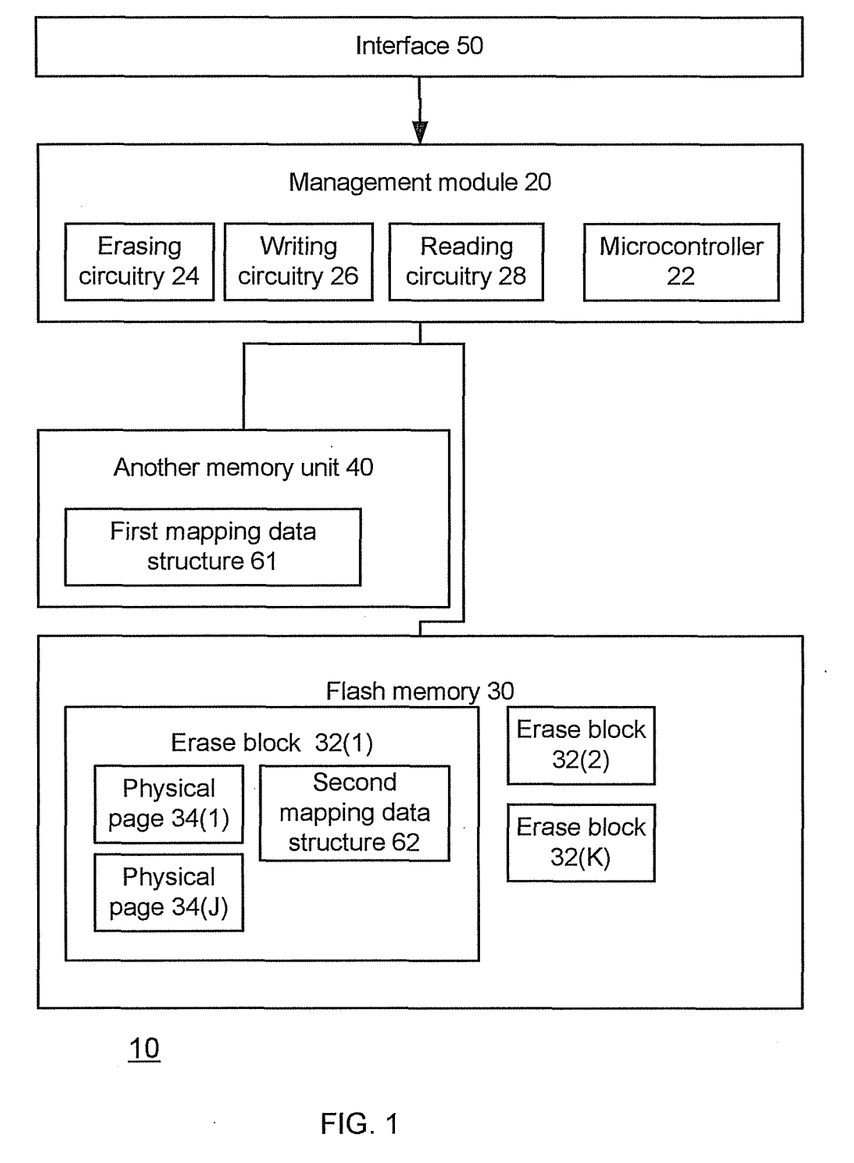
FIG. 1 illustrates a system according to an embodiment of the invention.

FIG. 1 illustrates system 10 according to an embodiment of the invention.

System 10 includes management module 20 that is connected to flash memory 30, another memory unit 40, and interface 50.

Interface 50 can receive an access request that is associated with a logical address that is mapped to a physical address of a set of flash memory cells. Interface 50 can receive the request from a software or hardware components such as a host, an application, and the like.

Flash memory 30 includes multiple erase blocks such as erase blocks 32(1)-32(K). Each erase block can include multiple pages. For example, FIG. 1 illustrates erase block 32(1) as including multiple physical pages (PPs) such as 34(1)-34(J). Each physical page includes multiple flash memory cells.

Flash memory 30 can include multiple flash memory cell sets. A set of flash memory cells can include one or more flash memory cells. A set of flash memory cells can be a physical page, a portion of a physical page, can include at least one memory page, include multiple physical memory page, and the like.

A physical page can store a representation of an information unit, a fraction of a representation of an information unit, more than a single representation of an information unit and the like. Accordingly—in one case information unit representations are aligned with physical page boundaries (this is referred to as an aligned scenario) but in some cases information unit representations are not aligned with physical page boundaries (this is referred to as the misaligned scenario). The non-aligned scenario can occur, for example, when applying variable rate encoding.

The mapping between logical addresses and physical addresses should take into account the alignment (or misalignment) between information unit representations and physical pages. Accordingly—the aligned scenario can be managed by using two mapping data structures while misaligned scenario can be managed by using three mapping data structures.

Management module 20 can include software components, hardware components or a combination thereof. It can include at least one of the following circuitries or be connected to one or more of the following circuitries without including them: (i) erasing circuitry, (ii) writing circuitry, and (iii) reading circuitry.

FIG. 1 illustrates management module 20 as including microcontroller 22, erasing circuitry 24, writing circuitry 26 and reading circuitry 28.

Interface 50 can receive a read request that is associated with a logical address that is mapped to a physical address of a set of flash memory cells.

Management module 20 receives the read request and in response accesses multiple mapping data structures of different granularity to obtain the physical address of the set of flash memory cells.

At least one mapping data structure is stored in an erase block and wherein the erase block includes multiple physical pages that are written in a sequential manner and are associated with logical page addresses that are assigned in a random manner.

Management module 20, in response to information obtained from the multiple mapping data structures access the set of flash memory cells and can read the set of flash memory cells.

FIG. 1 illustrates multiple mapping data structures as including first mapping data structure 61 and second mapping data structure 62. FIG. 1 illustrates second mapping data structure 62 as being stored in erase block 32(1) and first mapping data structure 61 as being stored at other memory unit 40. This is not necessarily so. For example, second mapping data structure 62 can be fetched from other memory unit 40.

A mapping data structure (such as first and second mapping data structures 61 and 62) of a certain granularity can store only information associated with the certain granularity. For example—first mapping data structure 61 does not store memory page level information and second mapping data structure 62 does not store erase block level mapping information.

First mapping data structure 61 can maps logical erase block addresses to physical erase block addresses. Second mapping data structure 62 can map logical inter erase block addresses to physical inter erase block addresses.

The logic address of the set of flash memory cells can include a logical erase block address a logical inter erase block address. Management module 40 can access first mapping data structure 61 with the logical erase block address and can access second mapping data structure 62 with the logical inter erase block address.

Management module 40 or another component (now shown) can generate the multiple mapping data structures. System 10 (or one of its components) can write the second mapping data structure 62 to flash memory 30 after a predefined number of physical pages of the erase block were written.

Interface 50 can receive a write request to write content, wherein the write request is associated with a logical address. Management module 20 can write the write content to a new set of flash memory cells that follow a last set of flash memory cells that were written to; and to update at least one mapping data structure to reflect the writing to the new set of flash memory cells.

Management module 20 can receive multiple write requests associated with the same logical address. It should update the one or more mapping data structures to point to the last (most updated) physical address that stores information associated with that logical address. This update can be perform in various manners. For example, management module 20 can invalidate all entries of the mapping data structure associated with that same logical address except the last entry of the group of entries.

Figure 2:
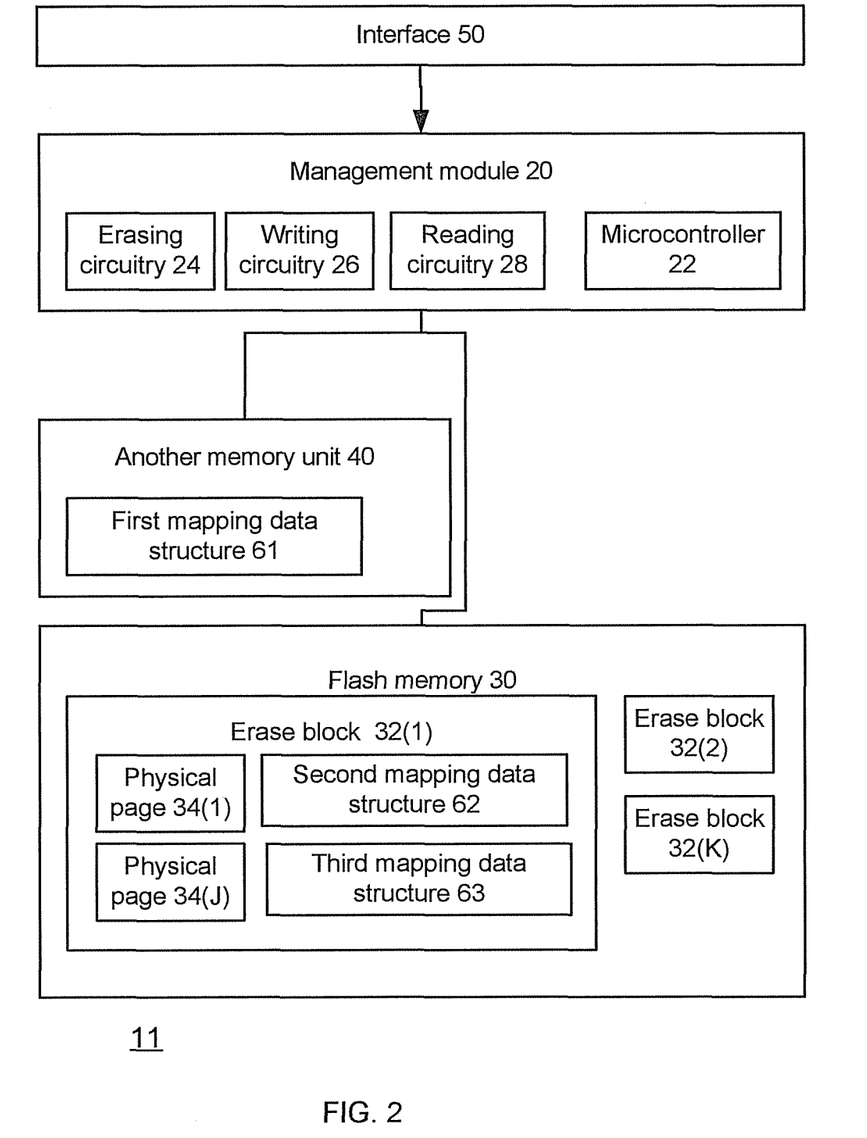
FIG. 2 illustrates a system according to an embodiment of the invention.

FIG. 2 illustrates system 11 according to another embodiment of the invention.

System 11 of FIG. 2 stores three mapping data structures 61, 62 and 63 while system 10 of FIG. 1 stores two mapping data structures 61 and 62.

Management module 40 can access first mapping data structure 61, second data structure 62 and third data structure 63.

First mapping data structure 61 maps logical erase block addresses to physical erase block addresses. Second mapping data structure 62 maps logical page addresses to indexes into third mapping data structure 63. Third data structure 63 maps the indexes to locations of sets of flash memory cells. Third data structure 63 is used to manage the misaligned scenario.

FIG. 2 illustrates third mapping data structure 63 as being stored at erase block 32(1).

Referring back to FIG. 1, management module 40 can retrieve, in response to the logical address, a block physical address of a target erase block of a flash memory from a first mapping table that stored information that differs from page level information; retrieve, in response to the logical address, a page address from a second mapping table that stored information that differs from block level information; wherein the target erase block stored the second mapping table; and write to a set of cells of the flash memory in response to the page address. The page address can be a start address of the set of flash memory cells.

Figure 3:
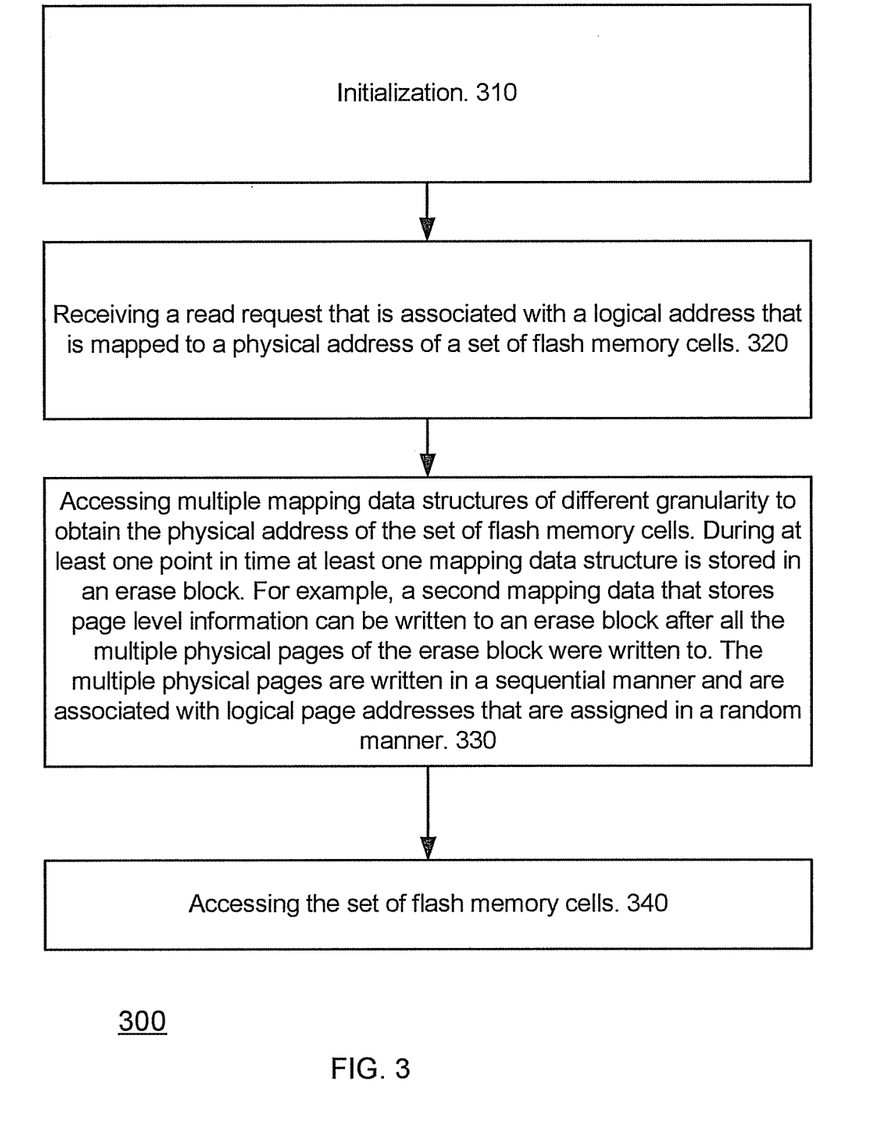
FIG. 3 illustrates a method according to an embodiment of the invention.

FIG. 3 illustrates method 300 according to an embodiment of the invention.

Method 300 starts by stage 310 of initialization. This stage can include receiving mapping data structure, generating mapping data structures, erasing one or more erase blocks and the like.

Stage 310 is followed by stage 320 of receiving a read request that is associated with a logical address that is mapped to a physical address of a set of flash memory cells.

Stage 320 is followed by stage 330 of accessing multiple mapping data structures of different granularity to obtain the physical address of the set of flash memory cells. During at least one point in time at least one mapping data structure is stored in an erase block. For example, a second mapping data that stores page level information can be written to an erase block after all the multiple physical pages of the erase block were written to. The multiple physical pages are written in a sequential manner and are associated with logical page addresses that are assigned in a random manner.

Stage 330 can include checking, for an accessed mapping data structure, whether it is stored in the flash memory or in another memory bank. Stage 330 can also include fetching a mapping data structure to the flash memory or vice verse. For example—mapping data structures can be fetched from the flash memory after a device is power up and sent to the flash memory when the device is powered down.

Stage 330 is followed by stage 340 of accessing the set of flash memory cells. Stage 340 includes reading the content of the set of flash memory cells. Stage 340 uses the address of the set of memory cells that was retrieved during stage 330.

A mapping data structure of a certain granularity can store only information associated with the certain granularity.

The logic address of the set of flash memory cells can include a logical erase block address and a logical inter erase block address. In this case stage 340 can include accessing a first mapping data structure that maps logical erase block addresses to physical erase block addresses and accessing a second mapping data structure that maps logical inter erase block addresses to physical inter erase block addresses.

At a certain point in time the second data can be stored in the flash memory.

Method 300 can include one or more stage of method 400 (of FIG. 4) of writing content to sets of flash memory cells. For example, stage 310 can include (or can be followed by) a stage of generating the multiple mapping data structures. The stage of generating can include writing the second mapping data structure to the flash memory after a predefined number of physical pages of the erase block were written.

The second mapping data structure can map logical addresses of pages to physical addresses of pages. Evenly sized logical pages can be stored in evenly sized physical pages.

Figure 4:
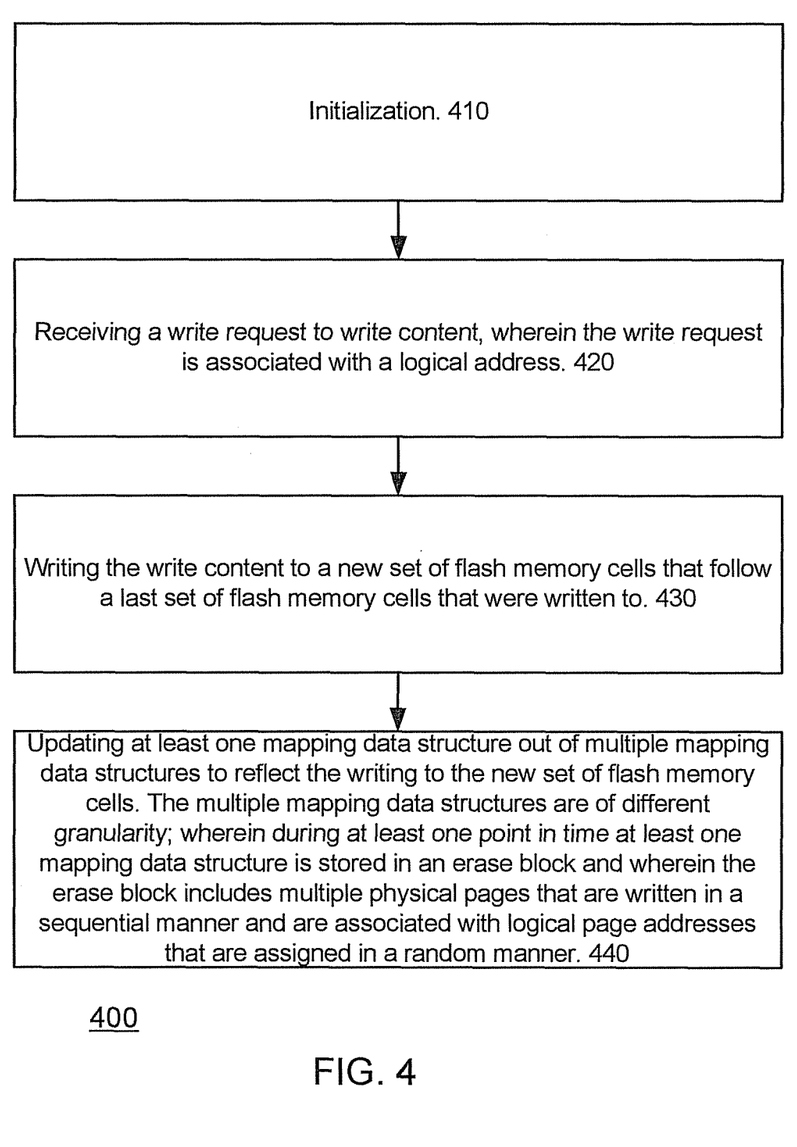
FIG. 4 illustrates a method according to an embodiment of the invention.

During at least one period a mapping data structure can be stored in another memory unit that differs from the flash memory. The other memory unit can be a Random Access Memory unit that temporarily stores the mapping data structure. while the According to another embodiment of the invention logical pages are of different length than physical pages—they can even be of a varying length. In this case there is a need in additional mapping information that can assist in reading pages of different sizes. Accordingly, stage 430 can include accessing a first mapping data structure, a second data structure and a third data structure; wherein the first mapping data structure maps logical erase block addresses to physical erase block addresses, the second mapping data structure maps logical page addresses to indexes into the third mapping data structure. The third data structure maps the indexes to locations of sets of flash memory cells.

FIG. 4 illustrates method 400 for writing to a flash memory, according to an embodiment of the invention.

Method 400 starts by stage 410 of initialization.

Stage 410 is followed by stage 420 of receiving a write request to write content, wherein the write request is associated with a logical address.

Stage 420 is followed by stage 430 of writing the write content to a new set of flash memory cells that follow a last set of flash memory cells that were written to. Stage 430 implements a sequential writing scheme—one set of flash memory cells is written after the other.

Stage 430 is followed by stage 440 of updating at least one mapping data structure out of multiple mapping data structures to reflect the writing to the new set of flash memory cells. The multiple mapping data structures are of different granularity; wherein during at least one point in time at least one mapping data structure is stored in an erase block and wherein the erase block includes multiple physical pages that are written in a sequential manner and are associated with logical page addresses that are assigned in a random manner.

Stage 440 can include generating a mapping data structure. A mapping data structure can be generated, for example, when physical pages of a new erase block are written or when a previous mapping data structure can not serve a new writing sequence.

Conveniently, a mapping data structure of a certain granularity stores only information associated with the certain granularity.

The logic address of the set of flash memory cells can include a logical erase block address and logical inter erase block address. Stage 440 can include updating or generating a first mapping data structure that maps logical erase block addresses to physical erase block addresses and updating or generating a second mapping data structure that maps logical inter erase block addresses to physical inter erase block addresses.

During at least one point in time the second data is stored in the flash memory.

Stage 440 can include generating the multiple mapping data structures; wherein the second mapping data structure is written to the flash memory after a predefined number of physical pages of the erase block were written.

The second mapping data structure maps logical addresses of pages to physical addresses of pages; wherein evenly sized logical pages are stored in evenly sized physical pages.

During at least one period the first mapping data structure is stored in memory unit that differs from the flash memory.

Stage 440 can include updating or generating a first mapping data structure, a second data structure and a third data structure; wherein the first mapping data structure maps logical erase block addresses to physical erase block addresses, the second mapping data structure maps logical page addresses to indexes into the third mapping data structure; wherein the third data structure maps the indexes to locations of sets of flash memory cells; wherein at least one erasure block comprises at least two sets of flash memory cells that differ from each other by their size but store representations of information units of the same size.

The at least two sets of memory cells store information that is encoded by a variable encoding process.

Stage 440 can include writing a mapping data structure to a memory unit that differs from the flash memory and storing the fetched mapping data structure in the flash memory.

Any combination of methods 300 and 400 can be provided. System 10 and 11 can execute either one of these methods or a combination thereof.

The methods and/or processes may be implemented as a computer readable medium having a computer readable code embodied therein, the computer readable code including instructions for the carrying out of at least one of the above disclosed methods and processes.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Each module can include software, hardware, firmware, middleware or a combination thereof.

The processor and RAM unit can belong to a memory controller unit, but this is not necessarily so.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, the word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for accessing a flash memory, the method comprises:
   receiving a read request that is associated with a logical address that is mapped to a physical address of a set of flash memory cells;
   accessing multiple mapping data structures of different granularity to obtain the physical address of the set of flash memory cells;
   wherein the accessing comprises accessing a first mapping data structure that maps logical erase block addresses to physical erase block addresses and accessing a second mapping data structure that comprises mapping information relating to multiple physical or logical pages;
   wherein the flash memory comprises multiple erase blocks, each erase block comprises multiple physical pages that are written in a sequential manner and are associated with logical page addresses that are assigned in a random manner;
   reading a content of the set of flash memory cells;
   writing to an erase block of the flash memory the second mapping data structure only after all the multiple physical pages of the erase block were written to the erase block;
   accessing the first mapping data structure, the second mapping data structure and a third mapping data structure;
   wherein the second mapping data structure maps logical page addresses to indexes into the third mapping data structure;
   wherein the third mapping data structure maps the indexes to locations of sets of flash memory cells to overcome misalignments between information unit representations stored in the physical pages of the flash memory and physical page boundaries of the flash memory; and
   wherein at least one erasure block comprises at least two sets of flash memory cells that differ from each other by their size but store representations of information units of the same size.

2. The method according to claim 1 wherein a mapping data structure of a certain granularity stores only information associated with the certain granularity.

3. The method according to claim 1, wherein the second mapping data structure stores mapping information relating to all of the multiple physical pages of the erase block.

4. The method according to claim 1, wherein the set of the flash memory cells is a single flash memory cell.

5. The method according to claim 1 wherein evenly sized logical pages are stored in evenly sized physical pages.

6. The method according to claim 1 wherein during at least one period the first mapping data structure is stored in memory unit that differs from the flash memory; and wherein the second mapping data structure maps logical inter erase block addresses to physical inter erase block addresses.

7. The method according to claim 1 wherein the at least two sets of memory cells store information that is encoded by a variable encoding process resulting in the misalignment between information unit representations stored in the physical pages of the flash memory and physical page boundaries of the flash memory.

8. The method according to claim 1 comprising storing the third mapping data structure in an erase block that further stores the second mapping data structure.

9. The method according to claim 1 comprising receiving a write request to write content, wherein the write request is associated with a logical address; writing the write content to a new set of flash memory cells that follow a last set of flash memory cells that were written to; and updating at least one mapping data structure to reflect the writing to the new set of flash memory cells.

10. The method according to claim 9 comprising invalidating all entries except a last entry of a group of entries of a mapping data structure that are associated with the same logic address.

11. A system having flash memory management capabilities, the system comprises a management module that is coupled to a flash memory, another memory unit, and an interface;
   wherein the interface receives a read request that is associated with a logical address that is mapped to a physical address of a set of flash memory cells; wherein the flash memory comprises multiple erase blocks;
   wherein the management module is adapted to:
      access multiple mapping data structures of different granularity to obtain the physical address of the set of flash memory cells; wherein the multiple mapping data structures comprise a first mapping data structure that maps logical erase block addresses to physical erase block addresses and a second mapping data structure that comprises mapping information relating to multiple physical or logical pages;

wherein the erase block comprises multiple physical pages that are written in a sequential manner and are associated with logical page addresses that are assigned in a random manner;

access the set of flash memory cells; and write to an erase block of the flash memory the second mapping data structure only after all the multiple physical pages of the erase block were written to the erase block;

wherein the management module accesses the first mapping data structure, the second mapping data structure and a third mapping data structure; wherein the second mapping data structure maps logical page addresses to indexes into the third mapping data structure to overcome misalignments between information unit representations stored in the physical pages of the flash memory and physical page boundaries of the flash memory; wherein the third data structure maps the indexes to locations of sets of flash memory cells; wherein at least one erasure block comprises two sets of flash memory cells that differ from each other by their size but store representations of information units of the same size.

12. The system according to claim 11 wherein a mapping data structure of a certain granularity store only information associated with the certain granularity.

13. The system according to claim 11, wherein the second mapping data structure stores mapping information relating to all of the multiple physical pages of the erase block.

14. The system according to claim 11, wherein the flash memory cells are eight bit per cell flash memory cells.

15. The system according to claim 11 wherein evenly sized logical pages are stored in evenly sized physical pages.

16. The system according to claim 11 wherein during at least one period the first mapping data structure is stored in memory unit that differs from the flash memory and wherein the second mapping data structure maps logical inter erase block addresses to physical inter erase block addresses.

17. The system according to claim 11 wherein the at least two sets of memory cells store information that is encoded by a variable encoding process resulting in the misalignment between information unit representations stored in the physical pages of the flash memory and physical page boundaries of the flash memory.

18. The system according to claim 11 wherein the management module is arranged to store the third mapping data structure in an erase block that further stores the second mapping data structure.

19. The system according to claim 11 wherein the interface is adapted to receive a write request to write content, wherein the write request is associated with a logical address; wherein the management module writes the write content to a new set of flash memory cells that follow a last set of flash memory cells that were written to; and to update at least one mapping data structure to reflect the writing to the new set of flash memory cells.

20. The system according to claim 19 wherein the management module invalidates all entries except a last entry of a group of entries of a mapping data structure that are associated with the same logic address.

21. A system having flash memory management capabilities, the system comprises a management module that is coupled to a flash memory, another memory unit, and an interface;

wherein the interface receives a write request to write content, wherein the write request is associated with a logical address; wherein the logical address comprises a logical erase block address and a logical inter erase block address;

wherein the flash memory comprises multiple erase blocks;

wherein the management module is adapted to:

write the write content to a new set of flash memory cells that follow a last set of flash memory cells that were written to; and update at least one mapping data structure out of multiple mapping data structures to reflect the writing to the new set of flash memory cells;

wherein the multiple mapping data structures are of different granularity;

wherein the multiple mapping data structures comprise a first mapping data structure that maps logical erase block addresses to physical erase block addresses and a second mapping data structure that maps inter erase block addresses to physical inter erase block addresses of an entire erase block; and write to an erase block of the flash memory the second mapping data only after all the multiple physical pages of the erase block were written to the erase block;

wherein the erase block comprises multiple physical pages that are written in a sequential manner and are associated with logical page addresses that are assigned in a random manner;

wherein the management module accesses the first mapping data structure, the second mapping data structure and a third mapping data structure; wherein the second mapping data structure maps logical page addresses to indexes into the third mapping data structure to overcome misalignments between information unit representations stored in the physical pages of the flash memory and physical page boundaries of the flash memory; wherein the third data structure maps the indexes to locations of sets of flash memory cells; wherein at least one erasure block comprises two sets of flash memory cells that differ from each other by their size but store representations of information units of the same size.

22. A method for writing to a flash memory, the method comprises:

receiving a write request to write content, wherein the write request is associated with a logical address;

writing the write content to a new set of flash memory cells that follow a last set of flash memory cells that were written to;

updating at least one mapping data structure out of multiple mapping data structures to reflect the writing to the new set of flash memory cells; wherein the multiple mapping data structures are of different granularity; wherein the multiple mapping data structures comprise a first mapping data structure that maps logical erase block addresses to physical erase block addresses and a second mapping data structure that comprises mapping information relating to multiple physical or logical pages;

writing to an erase block of the flash memory the second mapping data structure only after all the multiple physical pages of the erase block were written to the erase block;

wherein the erase block comprises multiple physical pages that are written in a sequential manner and are associated with logical page addresses that are assigned in a random manner; and accessing the first mapping data structure, the second mapping data structure and a third mapping data structure;

wherein the second mapping data structure maps logical page addresses to indexes into the third mapping data structure; wherein the third mapping data structure maps the indexes to locations of sets of flash memory cells to overcome misalignments between information unit representations stored in the physical pages of the flash memory and physical page boundaries of the flash memory; wherein at least one erasure block comprises at least two sets of flash memory cells that differ from each other by their size but store representations of information units of the same size.

* * * * *